(12) United States Patent
Silansky et al.

(10) Patent No.: US 11,461,698 B2
(45) Date of Patent: Oct. 4, 2022

(54) INTEGRATED MACHINE LEARNING AUDIOVISUAL APPLICATION FOR A DEFINED SUBJECT

(71) Applicant: Athene Noctua LLC, Bristow, VA (US)

(72) Inventors: Edward R. Silansky, Gainesville, VA (US); Brittani R. George, Herndon, VA (US); Wendy Messick Watson, Manhattan Beach, CA (US)

(73) Assignee: ATHENE NOCTUA LLC, Bristow, VA (US)

( * ) Notice: Subject to any disclaimer, the term of this patent is extended or adjusted under 35 U.S.C. 154(b) by 693 days.

(21) Appl. No.: 16/505,048

(22) Filed: Jul. 8, 2019

(65) Prior Publication Data

US 2020/0012965 A1 Jan. 9, 2020

Related U.S. Application Data

(60) Provisional application No. 62/695,463, filed on Jul. 9, 2018.

(51) Int. Cl.
*G06N 20/00* (2019.01)
*G06K 9/62* (2022.01)

(52) U.S. Cl.
CPC .......... *G06N 20/00* (2019.01); *G06K 9/6259* (2013.01)

(58) Field of Classification Search
CPC ......... H04L 43/08; H04L 67/22; G06N 20/00; G06N 3/08; G06N 3/0445; G06K 9/6259

(Continued)

(56) References Cited

U.S. PATENT DOCUMENTS 8,385,971 B2 2/2013 Rhoads et al.
8,805,110 B2 8/2014 Rhoads et al.
(Continued)

FOREIGN PATENT DOCUMENTS

CN 105335984 A * 2/2016
CN 108431823 A * 8/2018 ......... G06K 9/00744
(Continued)

OTHER PUBLICATIONS

Ryoo. M.S., "Human Activity Prediction: Early Recognition of Ongoing Activities from Streaming Videos", *IEEE International Conference on Computer Vision*, 2001, pp. 1036-1043.
(Continued)

*Primary Examiner* — Ruolei Zong
(74) *Attorney, Agent, or Firm* — Sterne, Kessler, Goldstein & Fox P.L.L.C.

(57) ABSTRACT

Disclosed herein are system, method, and computer program product embodiments for utilizing a feedback loop to continuously improve an artificial intelligence (AI) engine's determination of predictive features associated with a topic. An embodiment operates by training an AI engine for a topic using data from a data source, wherein the topic is associated with a geolocation. The embodiments first receives a set of predictive features for the topic from the trained AI engine. The embodiment transmits the set of predictive features for the topic to a set of electronic devices. The embodiment second receives a set of audiovisual content captured by the set of electronic devices. The set of electronic devices capture the set of audiovisual content based on the set of predictive features for the topic. The embodiment finally retrains the AI engine based on the first set of audiovisual content.

20 Claims, 4 Drawing Sheets

(58) Field of Classification Search
USPC .......................................................... 706/12
See application file for complete search history.

(56) References Cited

U.S. PATENT DOCUMENTS

| | | | |
|---|---|---|---|
| 8,887,281 B2 * | 11/2014 | Honig | H04L 63/1416 |
| | | | 713/189 |
| 9,949,519 B2 | 4/2018 | Koh | |
| 9,955,902 B2 | 5/2018 | Frank et al. | |
| 10,117,044 B2 | 10/2018 | Sharon et al. | |
| 10,127,326 B2 | 11/2018 | Petersen et al. | |
| 10,129,716 B1 | 11/2018 | Ronnau | |
| 10,135,764 B2 | 11/2018 | Ghafourifar et al. | |
| 10,142,396 B2 | 11/2018 | Kennedy et al. | |
| 10,171,488 B2 | 1/2019 | Moynahan et al. | |
| 2010/0063949 A1 | 3/2010 | Eaton et al. | |
| 2010/0207762 A1 | 8/2010 | Lee et al. | |
| 2011/0051992 A1 | 3/2011 | Cobb et al. | |
| 2014/0078300 A1 | 3/2014 | Tine et al. | |
| 2015/0067505 A1 * | 3/2015 | Metcalf | G06F 16/958 |
| | | | 707/751 |
| 2015/0309981 A1 | 10/2015 | Brav et al. | |
| 2017/0195698 A1 | 7/2017 | Patrick et al. | |
| 2018/0122114 A1 | 5/2018 | Luan et al. | |
| 2019/0340293 A1 * | 11/2019 | Wei | G06N 5/022 |
| 2019/0373165 A1 * | 12/2019 | Duan | H04N 5/23218 |

FOREIGN PATENT DOCUMENTS

| | | | | |
|---|---|---|---|---|
| CN | 109561322 A | * | 4/2019 | ....... H04N 21/23418 |
| WO | WO 02/14990 A1 | | 2/2002 | |
| WO | WO-2021107922 A1 | * | 6/2021 | ........... H04N 19/102 |

OTHER PUBLICATIONS

Turaga. P. et al., "Machine Recognition of Human Activities: A Survey". *IEEE Transactions on Circuits and Systems for Video Technology*, vol. 18, No. 11, Nov. 2008, pp. 1473-1488.

Campbell, A.T. et al., "The Rise of People-Centric Sensing", *IEEE Internet Computing*, Jul./Aug. 2008, pp. 12-21.

Niu, W. et al., "Human Activity Detection and Recognition for Video Surveillance", *IEEE International Conference on Multimedia and Expo*, 2004, pp. 719-722.

Yuen, J. and Torralba, A., "A Data-Driven Approach for Even Prediction", Proceedings of the 11$^{th}$ European Conference on Computer Vision: Part II. Heraklion, Crete, Greece: Springer-Verlag, 2010, pp. 707-720.

Mahtani, S. and Elinson, Z., "Artificial Intelligence Could Soon Enhance Real-Time Police Surveillance", Apr. 3, 2018, downloaded from https://www.wsj.com/articles/artificial-intelligence-could-soon-enhance-real-time-police-surveillance-1522761813.

* cited by examiner

INTEGRATED MACHINE LEARNING AUDIOVISUAL APPLICATION FOR A DEFINED SUBJECT

BACKGROUND

Artificial intelligence (AI) is increasingly being used to analyze human behavior, To make accurate predictions about various types of human behavior, an AI engine can be trained based on historical data associated with a topic such as an activity or process. The AI engine can "learn" from the historical data and determine predictive features for the topic being studied. However, it is often difficult to train an AI engine because the topic being studied is not well-defined, there is insufficient historical data, and/or the historical data is not relevant to the topic being studied. For example, it is often difficult to train an AI engine based on streaming video from cameras. This is because the streaming video often contains irrelevant information due to it being continuously captured and its wide field of view. This irrelevant information can cause the AI engine to not reliably determine predictive features for the topic being studied.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for enabling an artificial intelligence engine to continuously improve its determination of predictive features associated with a topic using content (e.g., audiovisual content) from a set of electronic devices using a feedback loop.

Artificial intelligence is increasingly being used to analyze a topic such as human behavior. For example, artificial intelligence can be used to identify signs (or predictive features) of criminal activity. These signs can then be provided to police and first responders to prevent new crimes or stop in progress crimes. To make accurate predictions about various types of human behavior, an artificial intelligence engine can to be trained based on data (e.g., historical data). But it is often difficult to train an artificial engine to make accurate predictions about various types of human behavior because there is insufficient data and/or the data is not relevant.

For example, to train an artificial intelligence engine to identify signs of criminal activity, users may upload content (e.g., audiovisual content) to the artificial intelligence engine. But often the uploaded content is not relevant. The uploaded content is often not subject matter relevant. For example, the content may not be associated with criminal activity. This is often the case where there is a large volume of content. For example, in London, England, there are more than 80,000 cameras that send video 24/7 from various places in the city of everything that occurs at those places. But the large volume of video from these cameras often contains irrelevant information to the topic being analyzed (e.g., criminal activity). This irrelevant information often makes it difficult to train the artificial intelligence engine to determine predictive features for the topic. The large volume of video also makes it difficult for the artificial intelligence engine to quickly determine predictive features for the topic so that an intervention action (e.g., calling the police in response to detecting a crime occurring) can be taken in a timely manner.

In addition to not being subject matter relevant, the content may not be geographically relevant. For example, the content may include indicators associated with criminal activity in one city but not another city. As a result, training an artificial intelligence engine to identify signs of criminal activity based on such data may actually cause the artificial engine to identify signs of criminal activity less accurately.

In addition, there is often not an effective way for users to share relevant content (e.g., audiovisual content) with an artificial intelligence engine to train it. Users often do not know what type of content to capture. Moreover, users often do not have an incentive to share relevant content with an artificial intelligence engine. This may be due to several reasons. First, users may not want to disclose who they are. Second, users may not want to share because they do not see how the community will benefit. Finally, users may not want to share content because they do not get a reward.

But the effectiveness of an artificial intelligence engine often depends on the analysis of large amounts of relevant data from various sources. Thus, there is a technological problem of how to improve the accuracy of an artificial intelligence engine using data from a variety of sources. This technological problem may be solved by the technological solution of using an initial set of predictive features for a topic generated from an artificial intelligence engine to enable users to repeatedly select and upload relevant content (e.g., audiovisual content) to train the artificial intelligence engine to produce more accurate predictive features. This feedback loop can continuously improve the artificial engine's determination of predictive features for a topic based on content crowd sourced from various electronic devices.

To improve the artificial engine's determination of predictive features for a topic, the feedback loop can utilize content crowdsourced from various electronic devices operated by a defined group of users in a defined geographic area over a defined period of time. This defined group of users can be associated with the topic being analyzed. This use of a defined group of users relevant to the topic being analyzed can ensure that irrelevant content (e.g., videos) is not used when training the artificial intelligence engine. This can improve the artificial engine's determination of predictive features for the topic. This is because the defined group of users will likely send relevant content for training the artificial intelligence engine. This is because the defined group of users likely have well understood characteristics and motivations. For example, a group of local residents in a city or neighborhood are likely to provide relevant content for that city or neighborhood. Thus, the feedback loop can train the artificial intelligence engine to more accurately determine the presence of a topic because the content utilized to train the artificial intelligence engine can be topic specific with respect to subject matter, location, and/or audience. Moreover, because the feedback loop can continuously receive new crowdsourced content from the defined group of users, the feedback loop can cause the artificial intelligence to maintain its ability accurately determine the presence of a topic.

The continuous refinement of the predictive features can also facilitate the upload of relevant content (e.g., audiovisual content) from the defined group of users. For example, the predictive features can be provided to the defined group of users prior to the capture of content (e.g., audiovisual content). The predictive features can then be used to select relevant content in advance of upload. The providing of the predictive features to defined group of users also allows for the training and education of the users so that over time they can focus on sending content that is more in line with the topic being analyzed. This can further improve the artificial engine's determination of predictive features for the topic.

In addition, users can be provided incentives for uploading relevant content (e.g., audiovisual). For example, the content can be ranked based on topic relevancy. Users who upload highly ranked content can then be provided various rewards. This encourages users to upload highly relevant content.

In addition, the use of a defined group of users allows embodiments herein to select rewards responsive to the interests of the defined group of users. The rewards can include, but are not limited to, cash rewards, local vendor benefits, and various other types of rewards as would be appreciated by a person of ordinary skill in the art. This rewards process can encourage the defined group of users to send topic specific content to train the artificial intelligence engine and improve its determination of predictive features for the topic. This rewards process can result in a large volume of topic specific content to train the artificial intelligence engine.

For example, there are more than million millennial persons in Miami, Fla. Over 90% of these millennial persons have a mobile device capable of capturing video. This rewards process can encourage these millennial persons to take videos of specific activities in their communities. Assuming just 20% of these millennial persons take videos of specific activities in their communities, the artificial intelligence engine can be trained using topic specific videos from over 540,000 mobile video cameras being used by a relevant group of users. And this group of users can be rewarded for doing so.

In addition, the predictor features may be used to trigger real time interventions. For example, audiovisual content containing one or more predictive features indicative of criminal activity can trigger a call to the police or first responders. This can also encourage users to upload highly relevant content because their upload may trigger a positive real world outcome.

Thus, embodiments herein enable an artificial intelligence engine to improve its determination of predictive features associated with a topic by establishing a feedback loop between the artificial intelligence engine and various electronic devices operated by a defined group of users.

Figure 1:
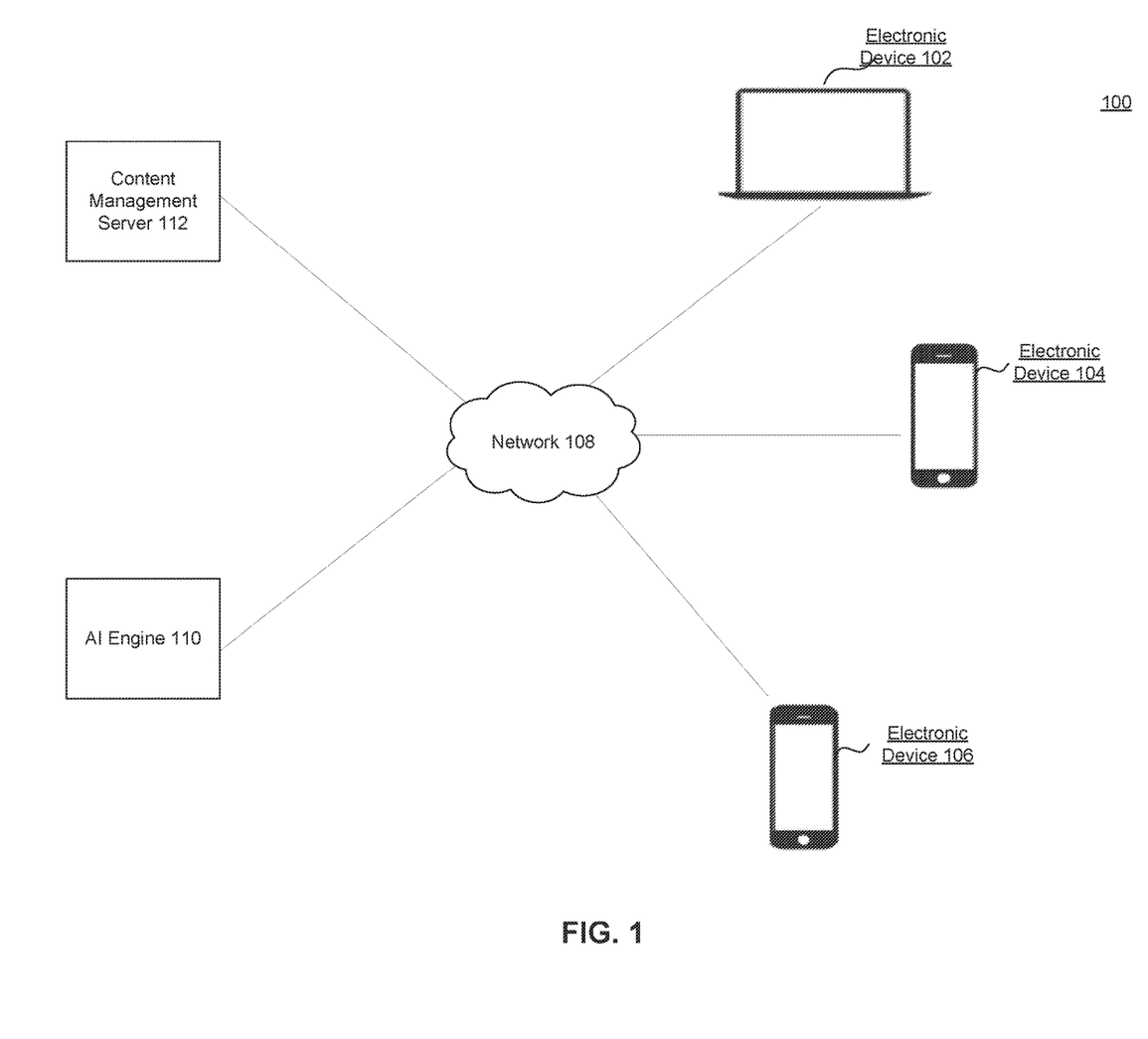
FIG. 1 is a block diagram of a system that continuously improves an artificial intelligence engine's determination of predictive features associated with a topic using content sent from various electronic devices operated by a defined group of users, according to some embodiments.

FIG. 1 illustrates an example system 100 for continuously improving an artificial intelligence engine's determination of predictive features associated with a topic using content (e.g., audiovisual content) sent from various electronic devices operated by a defined group of users, according to some embodiments. System 100 includes electronic devices 102, 104, and 106, content management server 112, and artificial intelligence (AI) engine 110. Electronic devices 102, 104, and 106, content management server 112, and artificial intelligence (AI) engine 110 can be configured to communicate with each other via network 108. Network 108 can include, without limitation, wired and/or wireless intranet, extranet, Internet, cellular. Bluetooth and/or any other local, short range, ad hoc, regional, global communications network, as well as any combination thereof. As would be appreciated by a person of ordinary, AI engine 110 can also be implemented on content management server 112.

An electronic device (e.g., electronic devices 102, 104, and 106) can include, but is not limited to, a desktop computer, laptop, smartphone, tablet, touchpad, wearable electronic device, smart watch, or other electronic device. It is to be appreciated that system 100 may include other electronic devices in addition to or in place of the electronic devices illustrated in FIG. 1 without departing from the scope and spirit of this disclosure. System 100 is discussed with reference to method 300 in FIG. 3.

Figure 2:
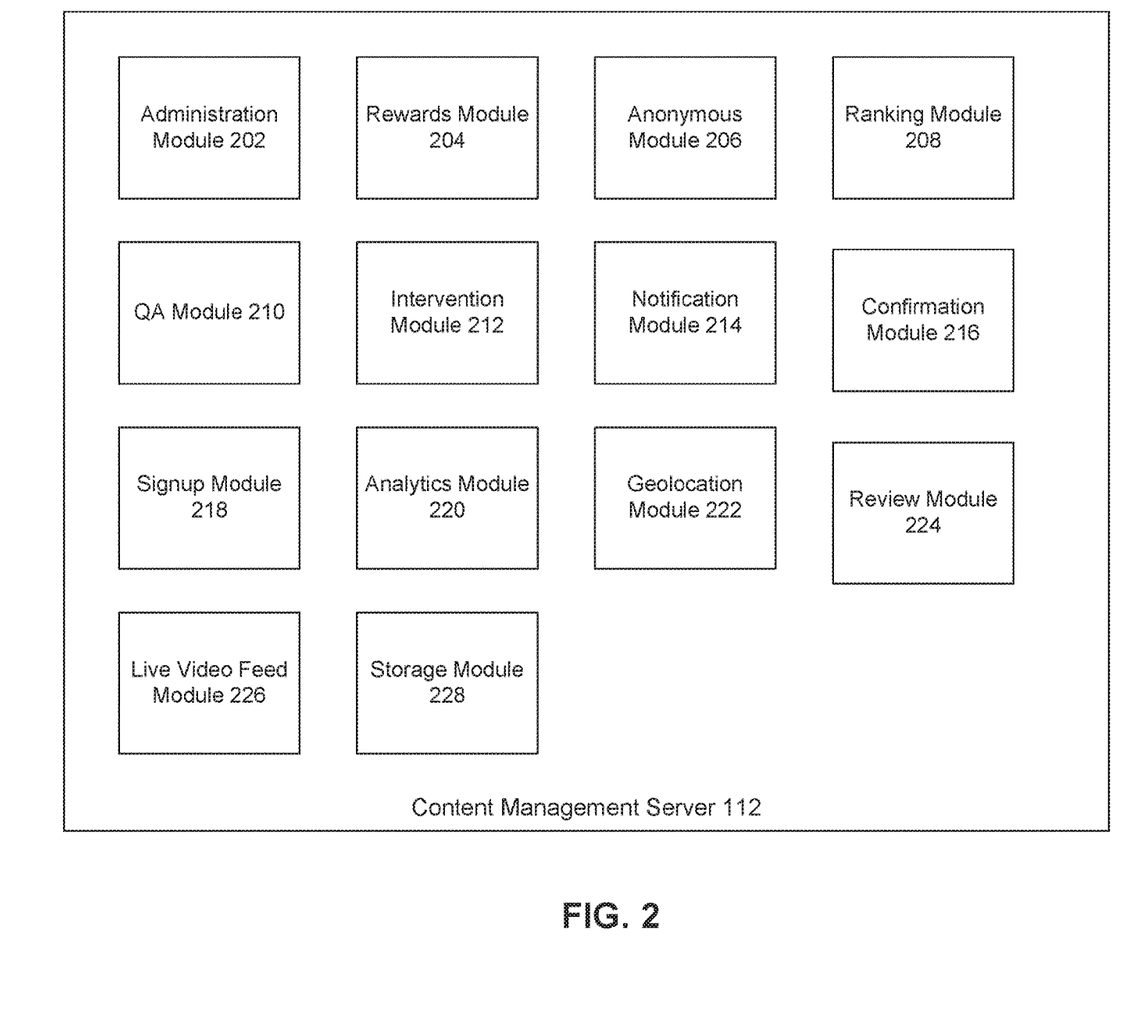
FIG. 2 is a block diagram of content management server 112, according to some embodiments.

FIG. 2 is a block diagram of content management server 112, according to some embodiments. Content management server 112 can include administration module 202, reward module 204, anonymous module 206, ranking module 208, QA module 210, intervention module 212, notification module 214, confirmation module 216, signup module 218, analytics module 220, geolocation module 222, review module 224, live video feed module 226, and storage module 228. Content management server 112 is discussed with reference to method 300 in FIG. 3.

Figure 3:
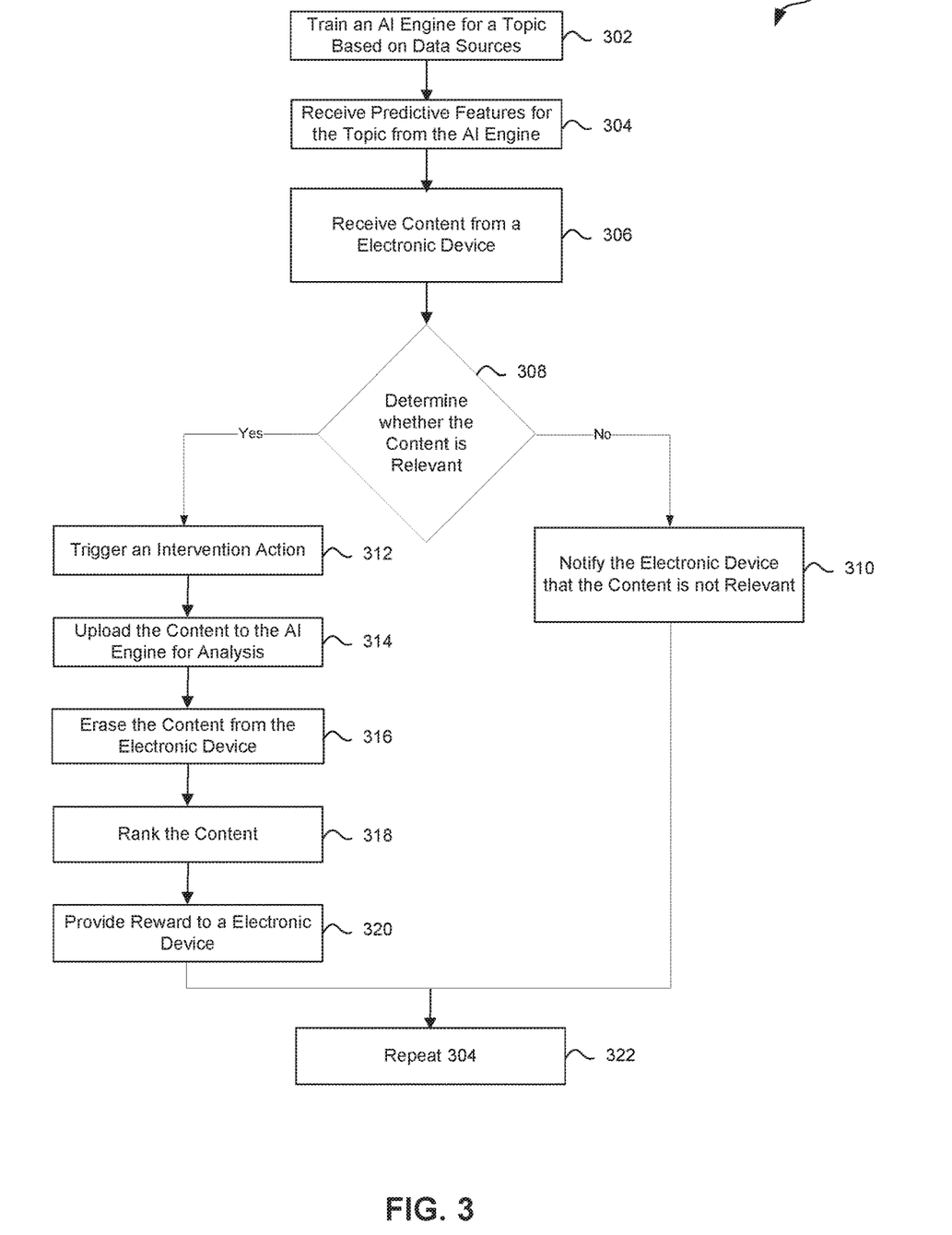
FIG. 3 is a flowchart illustrating a process for improving the determination of predictive features associated with a topic using content crowd sourced from various electronic devices operated by a defined group of users, according to some embodiments.

FIG. 3 is a flowchart for a method 300 for improving an artificial intelligence engine's determination of predictive features associated with a topic using content (e.g., audiovisual content) sent from various electronic devices operated by a defined group of users, according to an embodiment. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art.

Method 300 shall be described with reference to FIGS. 1 and 2. However, method 300 is not limited to that example embodiment.

In 302, content management server 112 requests the training of AI engine 110 for a topic. The topic can be a subject, activity, process, or matter of interest. For example, the topic can be criminal activity, a disaster, a protest, a community organization activity, or city traffic. As would be appreciated by a person of ordinary skill in the art, the topic can be associated with various other subjects, activities, processes, or matters of interest.

A topic can be defined for the AI engine 110 prior to content management server 112 requesting the training of AI engine 110 for that topic. An administrative user can use administration module 202 to define a topic for AI engine 110.

A topic can defined for a specific location (e.g., city, town, or other geographic area) where the topic occurs and where there is data available. For example, a topic of criminal activity can be defined for a neighborhood of a large city because crime is known to occur in that neighborhood and because there is data (e.g., police reports, surveys, eyewitness videos, etc.) available for that neighborhood. As would be appreciated by a person of ordinary skill in the art, an administrative user can use administration module 202 to redefine a topic. For example, an administrative user can expand the geographic area for the topic. This can expand the available data for the topic.

Content management server 112 can request the training of AI engine 110 using data (e.g., historical data) from one or more data sources. A data source can be public data source and/or a private data source. For example, a public data source can include, but is not limited to, police records, court records, academic studies, and city crime statistics. A private data source can include, but is not limited to, a social media network, company records, and organization survey records.

Content management server 112 can request the data from one or more data sources using an application programming interface (API). For example, in the case of detecting terrorism activity at airports, content management server 112 can use APIs provided by airports to request video surveillance of persons entering the airports. Similarly, in the case of detecting criminal activity in a neighborhood of a city, content management server 112 can use an API provided by the police department of the city to request police records, video surveillance, and demographic data of persons committing crimes in that neighborhood.

AI engine 110 can be trained using data from one or more data sources using machine learning techniques. As would be appreciated by a person of ordinary skill in the art, AI engine 110 can be trained using various machine learning techniques including, but not limited to, decision tree teaming, association rule learning, artificial neural networks, deep learning, inductive logic programing, support vector machines, clustering, Bayesian network, reinforcement learning, representation learning, similarity and metric learning, sparse dictionary learning, rule-based based machine learning, and learning classifier systems.

AI engine 110 can be trained using supervised machine learning or unsupervised machine learning. In supervised machine learning, AI engine 110 can be trained using data that includes example inputs and desired outputs. For example, the example input can be a picture of a person, and the desired output can be a criminal person.

In unsupervised machine learning, AI engine 110 can be trained using unlabeled data. Unlabeled data may not contain example inputs and desired outputs. AI engine 110 may attempt to determine predictive features in the raw data.

After training, AI engine 110 can identify one or more predictive features associated with the topic. A predictive feature can be, but is not limited to, an attribute, rule, or value associated with the topic. For example, AI engine 110 may determine that wearing gloves in the summer, wearing clothes that obscure body features, carrying a disposable cell phone, wearing particular colors, and/or carrying large amounts of cash are predictive features of criminal activity.

To confirm the initial training of AI engine 110, an administrative user can upload control content (e.g., control testing videos) to quality assurance (QA) module 210. The administrative user can then identity whether the control content is associated with the topic. QA module 210 can then calculate a confidence value for AI engine 110. The confidence value can be based on how often the AI engine 110 similarly identifies the control content as being associated with the topic as the administrative user did. As would be appreciated by a person of ordinary skill in the art, QA module 210 can calculate the confidence value using various statistical techniques. If the confidence value is low, AI engine 110 may not be sufficiently trained or may be biased. In this case, the administrative user can repeat the initial training of AI engine 110 using new or additional data (e.g., historical data).

In 304, content management server 112 receives one or more predictive features for the topic from AI engine 110. A predictive feature can be, but is not limited to, an attribute, rule, or value associated with the topic. For example, AI engine 110 may determine that wearing gloves in the summer, wearing clothes that obscure body features, carrying a disposable cell phone, wearing particular colors, and/or carrying large amounts of cash are predictive features of criminal activity. As would be appreciated by a person of ordinary skill in the art, the predictive features can be represented using various data formats and stored in various data structures.

In 306, content management server 112 provides the predictive features to any/all electronic devices 102, 104, and 106. For purposes of discussion, content management server 112 provides the predictive features to electronic device 102. However, as would be appreciated by a person of ordinary skill in the art, content management server 112 can provide the predictive features to any/all electronic devices including, but not limited to, electronic device 104 and 106.

Electronic device 102 can receive the predictive features at an app for Apple iOS, Google Android, or other mobile operating system as would be appreciated by a person of ordinary skill in the art. Electronic device 102 can also receive the predictive features at a web browser operating at itself.

Content management server 112 can provide the predictive features to a defined user group operating electronic devices. Users can register themselves with content management server 112 by submitting a registration request to signup module 218. Users can specify various demographic criteria about themselves during registration. For example, a user can specify demographic criteria such as, but not limited to, age, sex, education, occupation, geolocation, etc. Each user can be assigned a unique user identifier. An administrative user can select a set of users from the set of registered users to receive predictive features for a topic. This can cause electronic devices operated by those users to receive the predictive features for the topic. This also allows users operating those electronic devices to submit content to content management server 112 for that particular topic to improve AI engine 110's predictive performance.

Users can also specify whether they want to submit content anonymously as part of registration. Users can specify whether they want to submit content anonymously at their electronic device. For example, a user can indicate they want to remain anonymous by selecting a button at a graphical user interface on their electronic device. The user can switch their selection as they wish and as external events alter what they want to do. The ability of users to submit content anonymously can further encourage their submission of topically relevant content. In some embodiments, an administrative user can control whether users have the ability to submit content anonymously. In other words, the administrative user can allow a certain set of users to submit content anonymously.

A user at electronic device 102 can use the predictive features to identify and capture content (e.g., audiovisual content) that is relevant to the topic. For example, electronic device 102 can output (e.g., visual, auditory, or haptic output) one or more of the predictive features to the user of electronic device 102. This enables the user to identify topically relevant content for capture. This feature can assist in the training of the user so that they can provide more relevant content (e.g., take more accurate videos) of the topic in question.

In some embodiments, electronic device 102 can highlight the predictive features on a display of electronic device 102 prior to the user capturing the content (e.g., audiovisual content). For example, electronic device 102 can highlight on the display a person wearing particular color clothes that are associated with a criminal gang. Electronic device 102 can highlight the predictive features using a graphical overlay on the display of electronic device 102. This can assist a user in focusing in on those features that are predictive of the topic. Electronic device 102 can highlight the predictive features on the display using various techniques as would be appreciated by a person of ordinary skill in the art.

In some embodiments, electronic device 102 can use image recognition to associate one or more of the predictive features with the to be captured content (e.g., audiovisual content). As would be appreciated by a person of ordinary skill in the art, electronic device 102 can use various other techniques to associate one or more of the predictive features to the to be captured content including, but not limited to, time or geolocation comparison.

In 306, content management server 112 receives captured content (e.g., audiovisual content) from electronic device 102. For example, electronic device 102 can capture a video or photo as content using a camera. Content management server 112 can notify electronic device 102 that it received the content. As would be appreciated by a person of ordinary skill in the art, content management server 112 can receive captured content from any/all electronic devices including, but not limited to, electronic device 104 and 106, in response to receiving captured content from electronic device 102, confirmation module 216 can be provide a notification to electronic device 102.

In some embodiments, prior to capturing audiovisual content, electronic device 102 can optionally determine whether the user uploading the content (e.g., audiovisual content) is a certain age ramie. For example, electronic device 102 can determine whether the user is a millennial (e.g., born between 1982 and 2002). Electronic device 102 can determine whether the user is a certain age by requesting the user enter their birth date prior to capturing the audio-visual content. As would be appreciated by a person of ordinary skill in the art, electronic device 102 can determine whether the user is a certain age using various other techniques including, but not limited to, checking the user's social media network profile. In some embodiments, only users who are in the certain age range (e.g., millennials) are allowed to upload content and receive awards. Electronic device 102 can also determine whether the user uploading the content is in a certain age range based on the information they submitted as part of registering with signup module 218.

Prior to capturing audiovisual content, electronic device 102 can also optionally determine whether the user uploading the content (e.g., audiovisual content) meets various other demographic criteria. For example, electronic device 102 can determine whether the user uploading the content is a certain sex, has a certain occupation, has a certain education, or has certain other criteria as would be appreciated by a person of ordinary skill in the art. Electronic device 102 can determine whether the user uploading the content meets this criteria based on the information they submitted as part of registering with signup module 218.

In some embodiments, content management server 112 can receive various types of metadata associated with the captured content (e.g., audiovisual content). The metadata can include a content identifier that uniquely identifies the content among uploaded content. The metadata may include a user identifier that uniquely identifies the user who captured and/or uploaded the content. The metadata may include a geolocation where the content was captured. The metadata may include a timestamp indicating when the content was captured. The metadata may include a user group associated with the user. The user group may include users sharing common characteristics (e.g., millennial persons in Baltimore). The metadata may include a private flag that indicates whether the audiovisual content is private or public. Content management server 112 can use the private flag to prevent the content from being shared with other users. As would be appreciated by a person of ordinary skill in the art, the metadata can include various other data associated with the audiovisual content.

In some embodiments, content management server 112 can receive the captured content in encrypted form from electronic device 102. This can preserve the confidentiality of the exchanged content (e.g., audiovisual content). As would be appreciated by a person of ordinary skill in the art, content management server 112 can receive the encrypted content using various types of cryptographic systems including, but not limited to, public key cryptography and/or symmetric cryptography.

For example, content management server 112 can receive the captured content in encrypted form by establishing a secure communication link with electronic device 102. Content management server 112 can establish this secure communication link using secure socket layer (SSL), transport layer security (TLS), or various other secure transmission techniques as would be appreciated by a person of ordinary skill in the art.

In 308, content management server 112, via analytics module 220, determines whether the content is relevant to the topic. If the content is not relevant to the topic, content management server 112 proceeds to 210. If the content is relevant to the topic, content management server 112 proceeds to 212.

Thus, in 308, content can be initially screened for compliance with the topic selected by the content management server 112. This can be accomplished through the use of the initially produced predictive features for the topic. This can also ensure that content management server 112 stores relevant content for the topic, and sends relevant content for the topic to AI engine 110 for further training.

In some embodiments, content management server 112, via analytics module 220, can determine whether the content (e.g., audiovisual content) is relevant to the topic by determining whether a minimum number of the predictive features are present in the content. For example, content management server 112 can use image recognition to filter the audiovisual content based on the predictive features. For example, content management server 112 can select audiovisual content containing one or more of the predictive features for further analysis by AI engine 110. As would be appreciated by a person of ordinary skill in the art, content management server 112 can use various techniques to determine whether the predictive features are present in the audiovisual content including, but not limited, to image recognition.

In some embodiments, content management server 112, via analytics module 220, can determine whether the content is relevant to the topic by analyzing other features associated with the content. For example, content management server 112 can filter the content based on a geolocation associated with the content. Content management server 112 can use geolocation module 222 to filter the content based on the geolocation associated with the content. As would be appreciated by a person of ordinary skill in the art, content management server 112 can determine whether the content is relevant to the topic using various other techniques.

In 310, in response to content management server 112 determining the content (e.g., audiovisual content) is not relevant to the topic, content management server 112 can notify electronic device 102 that the content was rejected. Content management server 112 can indicate a reason why the content was rejected in the notification to electronic device 102. This can encourage the user of electronic device 102 to provide more topically relevant content in the future. The reason why the content was rejected can be provided by analytics module 220 (e.g., a minimum number of the predictive features are not present in the content).

In some embodiments, an administrative user can review rejected content and why it was rejected. The administrative user can also add additional explanation to the reason why the content was rejected prior to content management server 112 notifying electronic device 102 that the content was rejected.

In 312, in response to content management server 112 determining the content is relevant to the topic, content management server 112 optionally triggers an intervention action using intervention module 212. An intervention action may include calling the police, calling emergency services, issuing a crime alert, issuing a severe weather alert, or performing any other type of action that is responsive to the topic as would be appreciated by a person of ordinary skill in the art.

In some embodiments, intervention module 212 can use an API to trigger an intervention action. For example, intervention module 212 can use an API provided by a police department to submit in progress crime activity data to the police department.

In some embodiments, content management server 112 determines whether to trigger an invention action based on whether a threshold number of the predictive features are present in the audiovisual content. For example, if the topic is criminal activity, and a threshold number of the predictive features are present in the audiovisual content, content management server 112 can trigger a call to the police to stop a potential or in progress crime. As would be appreciated by a person of ordinary skill in the art, an administrative user can set the threshold number of the predictive features that must be present for content being analyzed for a topic using administration module 202. Moreover, as would be appreciated by a person of ordinary skill in the art, this can vary for different topics.

In some embodiments, content management server 112 can provide various types of data with an intervention request. Content management server 112 can provide the content. For example, content management server 112 can provide, via live feed module 226, a video of an in progress crime to the police for their review. Content management server 112 can provide, via geolocation module 222, the geolocation of where the audiovisual content was captured. Content management server 112 can provide the name of the user who captured the audiovisual content. As would be appreciated by a person of ordinary skill in the art, content management server 112 can provide various other types of data to facilitate performance of an intervention.

In some embodiments, content management server 112 can notify, via notification module 214, electronic device 102 that an intervention action has taken in response to the audiovisual content. This can provide users immediate satisfaction. Users are informed that their uploaded audiovisual content had a positive outcome.

In 314, content management server 112 uploads the audiovisual content to AI engine 110 for analysis. In some embodiments, content management server 112 can request the retraining of AI engine 110 based on the uploaded audiovisual content. After retraining, AI engine 110 may identify one or more new predictive features associated with the topic. Content management server 112 can receive the one or more new predictive features from AI engine 110 in 204 when method 200 is repeated. Thus, this retraining can create a feedback loop. The feedback loop can involve the uploading of content that satisfies the predictive features, refining the predictive features based on the uploaded content, and uploading new content based on the refined predictor features. The establishment of this feedback loop can continuously improve the predictive accuracy of AI engine 110.

In some embodiments, content management server 112 stores, via storage module 228, the uploaded content for further analysis and monetization opportunities. For example, content management server 112 can optionally rank, via ranking module 208, the uploaded content in 216 to provide rewards to users.

In some embodiments, content management server 112 can store the audiovisual content in a block chain data structure. In some embodiments, content management server 112 can store a portion of the content having a particular characteristic in a block chain specific to that characteristic. For example, content management server 112 can store content for the city of Baltimore in a block chain specific to the city of Baltimore. As would be appreciated by a person of ordinary skill in the art, the storage of the content in a block chain data structure can provide various monetization opportunities.

In 316, content management server 112 can optionally trigger the secure erasure of the content on electronic device 102. Content management server 112 can trigger the erasure in response to the acceptance of the content by content management system 110. Content management server 112 can also trigger the erasure in response to the upload of the content to AI engine 110. In other words, the secure erasure of the content on electronic device 102 is triggered by content management system 102, not electronic device 102. The secure erasure of the audiovisual content on electronic device 102 can ensure that content management server 112 can control the sharing and distribution of the content. Electronic device 102 can also erase the content itself shortly after sending it to content management server 112.

In 318, content management server 112 can optionally rank the uploaded content among other content. In some embodiments, content management server 112 can request a ranking of the uploaded content from ranking module 208. Ranking module 208 can rank the uploaded content based on how well each item of the content satisfies the predictive features for the topic. Ranking module 208 can rank content uploaded during a specific time period (e.g., every day, every week, or every month). Ranking module 208 can rank content uploaded based on a particular location. As would be appreciated by a person of ordinary skill in the art, Ranking module 208 can rank content across various other dimensions of interest.

In some embodiments, content management server 112, via ranking module 208, can determine a ranking of the uploaded content based on real world outcomes. For example, content management server 112 can determine a ranking of the uploaded content based on whether the content triggered an intervention action (e.g., police arrest, stopping of crime, saving of a life, etc.) As would be appreciated by a person of ordinary skill in the art, content management server 112 can determine a ranking of the uploaded content using various other techniques including, but not limited to, human curation, human voting, whether a user previously selected as uploading the most relevant content, and/or whether the user is a paid subscription user.

In 320, content management server 112 can, via rewards module 204, provide a reward (e.g., money, a promotion discount, publicity) to a user at an electronic device who uploaded particular content based on the ranking of the content. For example, if the user at electronic device 102 uploaded content that received a particularly high ranking, content management server 112 can provide the user at electronic device 102 a cash reward.

In some embodiments, content management server 112 can provide different rewards based on the ranking of the content. For example, content management server 112 can provide a $5,000 reward for content having a first place ranking, a $3,000 reward for content having a second place ranking, and a $1,000 reward for content having a third place ranking. As would be appreciate by a person of ordinary skill in the art, content management server 112 can provide other monetary reward combinations.

In some embodiments, content management server 112 can provide different rewards based on the type of user who uploaded the content. For example, content management server 112 can provide a cash reward for paying users, and a publicity reward for non-paying users. As would be appreciated by a person of ordinary skill in the art, content management server 112 can provide different rewards based on various other factors including, but not limited to, the geolocation of a user, whether the user previously received an award, and how many items of content the user has uploaded. Rewards can also be non-monetary, such as public recognition or access to addition features of content management server 112.

In some embodiments, content management server 112 can track various types of data associated with the uploaded content. Content management server 112 can track the total number of content uploads. Content management server 112 can track the number of content uploads per topic. Content management server 112 can track the number of content uploads per location. Content management server 112 can track the number of reward recipients, the reward recipients per day, the number reward recipients per location, and/or the number of different reward types received. Content management server 112 can track the reasons why particular content was ranked high, and therefore received rewards.

In some embodiments, content management server 112 can output the tracked data associated with the uploaded content to any/all electronic devices. This can encourage users of the electronic devices to upload content. For example, content management server 112 may output the number reward recipients for a particular location. This may encourage users at the particular location to upload content in the hope of receiving a reward.

In 322, method 300 is repeated at 304. This causes the refinement of the predictive features for a particular topic based on uploaded content. This further encourages the uploading of new, relevant content. As a result, this feedback loop continuously improves the predictive accuracy of AI engine 110. Thus, as the quality of the predictive features for a given topic improve, AI engine 110 can more accurately predict outcomes of certain defined behavior before it actually happens.

Figure 4:
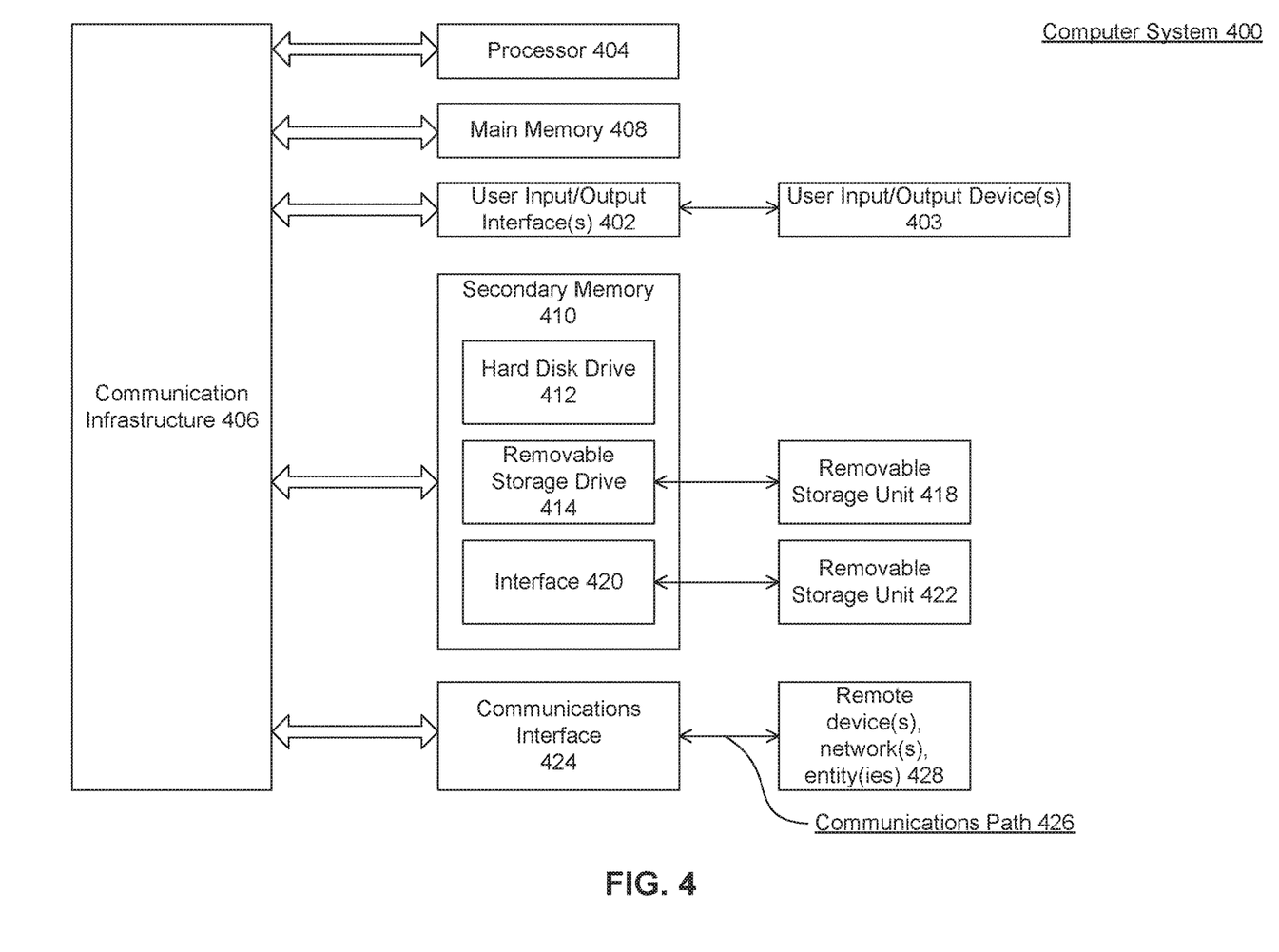
FIG. 4 is an example computer system useful for implementing various embodiments.

Various embodiments can be implemented, for example, using one or more computer systems, such as computer system 400 shown in FIG. 4. Computer system 400 can be used, for example, to implement method 300 of FIG. 3. Computer system 400 can be any computer capable of performing the functions described herein.

Computer system 400 can be any well-known computer capable of performing the functions described herein.

Computer system 400 includes one or more processors (also called central processing units, or CPUs), such as a processor 404. Processor 404 is connected to a communication infrastructure or bus 406.

One or more processors 404 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 also includes user input/output device(s) 403, such as monitors, keyboards, pointing devices, etc., that communicate with communication infrastructure 406 through user input/output interface(s) 402.

Computer system 400 also includes a main or primary memory 408, such as random-access memory (RAM). Main memory 408 may include one or more levels of cache. Main memory 408 has stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 includes a computer usable or readable storage device having stored thereon computer software (control logic) and/or data. Removable storage unit 418 may be a floppy disk, magnetic tape, compact disk, MD, optical storage disk, and/any other computer data storage device. Removable storage drive 414 reads from and/or writes to removable storage unit 418 in a well-known manner.

According to an exemplary embodiment, secondary memory 410 may include other means, instrumentalities or other approaches for allowing computer programs and/or other instructions and/or data to be accessed by computer system 400. Such means, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 enables computer system 400 to communicate and interact with any combination of remote devices, remote networks, remote entities, etc. (individually and collectively referenced by reference number 428). For example, communication interface 424 may allow computer system 400 to communicate with remote devices 428 over communications path 426, which may be wired and/or wireless, and which may include any combination of LANs, WANs, the Internet, etc. Control logic and/or data may be transmitted to and from computer system 400 via communication path 426.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer implemented method for training an artificial intelligence (AI) engine for a topic, comprising:
    training, by at least one processor, the AI engine for the topic using data from a data source, wherein the topic is associated with a first geolocation;
    first receiving, by the at least one processor, a first set of predictive features for the topic from the trained AI engine;
    transmitting, by the at least one processor, the first set of predictive features for the topic to a set of electronic devices;
    second receiving, by the at least one processor, a first set of audiovisual content captured by the set of electronic devices based on the first set of predictive features for the topic;
    determining, using the trained AI engine, that audiovisual content in the first set of audiovisual content is relevant to the topic based on the first set of predictive features and a second geolocation associated with the first set of audiovisual content; and
    retraining, by the at least one processor, the AI engine based on the first set of audiovisual content.

2. The method of claim 1, wherein the second receiving comprises:
    receiving, by the at least one processor, the first set of audiovisual content captured by the set of electronic devices based on a set of user characteristics.

3. The method of claim 1, wherein the second receiving comprises:
    receiving, by the at least one processor, the audiovisual content in the first set of audiovisual content from an anonymous user of an electronic device in the set of electronic devices.

4. The method of claim 1, further comprising:
    triggering, by the at least one processor, an erasure of the audiovisual content in the first set of audiovisual content at an electronic device in the set of electronic devices based on the determination that the audiovisual content in the first set of audiovisual content is relevant to the topic.

5. The method of claim 1, further comprising:
    triggering, by the at least one processor, an intervention action based on a threshold number of predictive features of the first set of predictive features being present in the audiovisual content in the first set of audiovisual content, wherein the audiovisual content in the first set of audiovisual content is captured by an electronic device in the set of electronic devices; and
    notifying, by the at least one processor, the electronic device in the set of electronic devices of the triggered intervention.

6. The method of claim 1, further comprising:
receiving, by the at least one processor, a second set of predictive features for the topic from the retrained AI engine;
transmitting, by the at least one processor, the second set of predictive features for the topic to the set of electronic devices;
receiving, by the at least one processor, a second set of audiovisual content captured by a portion of the set of electronic devices based on the second set of predictive features for the topic; and
retraining, by the at least one processor, the AI engine based on the second set of audiovisual content.

7. The method of claim 1, further comprising:
ranking, by the at least one processor, the first set of audiovisual content for the topic based on the first set of predictive features; and
providing, by the at least one processor, a reward to an electronic device in the set of electronic devices based on the ranking.

8. A system, comprising:
a memory; and
at least one processor coupled to the memory and configured to:
train an artificial intelligence (AI) engine for a topic using data from a data source, wherein the topic is associated with a first geolocation;
first receive a first set of predictive features for the topic from the trained AI engine;
transmit the first set of predictive features for the topic to a set of electronic devices;
second receive a first set of audiovisual content captured by the set of electronic devices based on the first set of predictive features for the topic;
retrain the AI engine based on the first set of audiovisual content;
trigger an intervention action based on a threshold number of predictive features of the first set of predictive features being present in audiovisual content in the first set of audiovisual content, wherein the audiovisual content in the first set of audiovisual content is captured by an electronic device in the set of electronic devices; and
notify the electronic device in the set of electronic devices of the triggered intervention.

9. The system of claim 8, wherein to second receive at least one processor is configured to:
receive the first set of audiovisual content captured by the set of electronic devices based on a set of user characteristics.

10. The system of claim 8, wherein to second receive at least one processor is configured to:
receive the audiovisual content in the first set of audiovisual content from an anonymous user of the electronic device in the set of electronic devices.

11. The system of claim 8, the at least one processor further configured to:
determine, using the trained AI engine, that the audiovisual content in the first set of audiovisual content is relevant to the topic based on the first set of predictive features and a second geolocation associated with the first set of audiovisual content.

12. The system of claim 8, the at least one processor further configured to:
receive a second set of predictive features for the topic from the retrained AI engine;
transmit the second set of predictive features for the topic to the set of electronic devices;
receive a second set of audiovisual content captured by a portion of the set of electronic devices based on the second set of predictive features for the topic; and
retrain the AI engine based on the second set of audiovisual content.

13. The system of claim 8, the at least one processor further configured to:
rank the first set of audiovisual content for the topic based on the first set of predictive features; and
provide a reward to the electronic device in the set of electronic devices based on the ranking.

14. A non-transitory computer-readable device having instructions stored thereon that, when executed by at least one computing device, causes the at least one computing device to perform operations comprising:
training an artificial intelligence (AI) engine for a topic using data from a data source, wherein the topic is associated with a first geolocation;
first receiving a first set of predictive features for the topic from the trained AI engine;
transmitting the first set of predictive features for the topic to a set of electronic devices;
second receiving a first set of audiovisual content captured by the set of electronic devices based on the first set of predictive features for the topic;
determining, using the trained AI engine, that audiovisual content in the first set of audiovisual content is relevant to the topic based on the first set of predictive features and a second geolocation associated with the first set of audiovisual content; and
retraining the AI engine based on the first set of audiovisual content.

15. The non-transitory computer-readable device of claim 14, wherein the second receiving further comprises:
receiving the first set of audiovisual content captured by the set of electronic devices based on a set of user characteristics.

16. The non-transitory computer-readable device of claim 14, the operations further comprising:
triggering an intervention action based on a threshold number of predictive features of the first set of predictive features being present in the audiovisual content in the first set of audiovisual content, wherein the audiovisual content in the first set of audiovisual content is captured by an electronic device in the set of electronic devices; and
notifying the electronic device in the set of electronic devices of the triggered intervention.

17. The non-transitory computer-readable device of claim 14, the operations further comprising:
receiving a second set of predictive features for the topic from the retrained AI engine;
transmitting the second set of predictive features for the topic to the set of electronic devices;
receiving a second set of audiovisual content captured by a portion of the set of electronic devices based on the second set of predictive features for the topic; and
retraining the AI engine based on the second set of audiovisual content.

18. The non-transitory computer-readable device of claim 14, wherein the second receiving further comprises:
receiving the audiovisual content in the first set of audiovisual content from an anonymous user of an electronic device in the set of electronic devices.

19. The non-transitory computer-readable device of claim 14, the operations further comprising:
triggering an erasure of the audiovisual content in the first set of audiovisual content at an electronic device in the set of electronic devices based on the determination that the audiovisual content in the first set of audiovisual content is relevant to the topic.

20. The non-transitory computer-readable device of claim 14, the operations further comprising:
ranking the first set of audiovisual content for the topic based on the first set of predictive features; and
providing a reward to an electronic device in the set of electronic devices based on the ranking.

\* \* \* \* \*